3,096,237
METHODS OF COMBATING MITES AND FUNGI
Engelbert Kühle and Ferdinand Grewe, Cologne-Stammheim, Günter Unterstenhofer, Opladen, Martin Boness, Bergisch-Neukirchen, and Richard Wegler, Leverkusen, Germany, assignors to Farbenfabriken Bayer Aktiengesellschaft, Leverkusen, Germany, a corporation of Germany
No Drawing. Filed May 11, 1960, Ser. No. 28,215
Claims priority, application Germany May 13, 1959
8 Claims. (Cl. 167—30)

The present invention relates to and has as its objects pest control agents with outstanding biological activities against insects, especially mites, as well as against phytopathogenic fungi. This invention furthermore relates to a method of combating the aforementioned pests with these compounds.

Generally the compounds to which this invention is related may be represented by the following formula

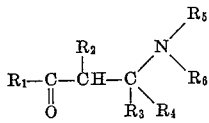

In the above formula $R_1$ may denote an optionally substituted alkoxy, aroxy, aralkoxy radical, the radical of a heterocyclic alcohol, an aliphatic, aromatic or heterocyclic amino group which may be further substituted at the nitrogen atom, a hydroxylamine radical, an optionally substituted hydrazine radical or a sulfonic acid amide radical; $R_2$ stands for hydrogen, an alkyl radical or, together with $R_3$, for an additional C—C-bond; moreover, $R_3$ may denote hydrogen; $R_4$ represents an alkyl radical, an optionally substituted aryl, cycloalkyl or heterocyclic radical; $R_5$ and $R_6$ may be identical or different and stand for hydrogen, an alkyl, aryl, aralkyl, heterocyclic radical or for the group

wherein $R_7$ and $R_8$ may denote hydrogen, an alkyl, aryl or acyl radical.

The compounds useful according to the present invention are partially known and if not known may be prepared strictly in accordance with the methods known for the preparation of the known compounds. Thus, the compounds used to this invention are expediently produced according to the following general reaction scheme in which the radicals $R_1$ to $R_6$ have the above mentioned significance:

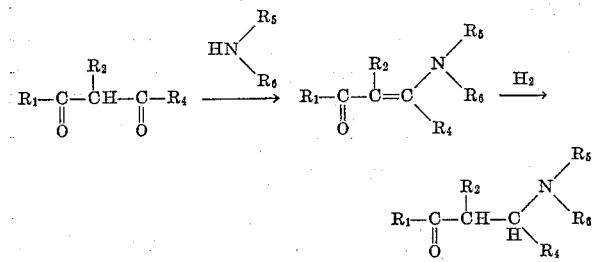

As it is to be seen from the above scheme a suitable β-dicarbonyl-compound is reacted with a suitable amine or with ammonia and the acrylic derivative eventually is hydrogenated to a saturated compound.

Part of the compounds may be obtained starting from (suitable) diketenes; in case of $R_2$ of the above formulae being hydrogen. The following scheme may illustrate this way:

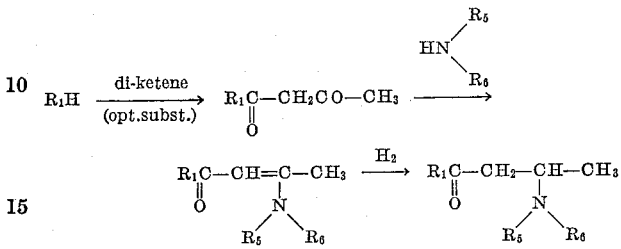

As stated above part of the inventive compounds are known. The reaction of aceto-acetic acid derivatives with primary or secondary amines yields derivatives of β-aminocrotonic acid some of which have been described in the literature (e.g. Ber. 29, 105 (1896); A. ch. (10), 18, 117 (1932) and Soc. 1936, 856).

The following compounds are given as examples of plant protective agents which may be used alone or in admixture with known active substances, auxiliaries or carrier materials, without, however, limiting this invention thereto:

β-Dodecylamino-β-phenylacrylic acid methyl ester,
β-Dibutyl-amino-β-(p-chlorophenyl)-acrylic acid phenyl ester,
β-Octadodecylamino-β-(p-nitrophenyl)-acrylic acid dimethyl amide,
β-Dodecylamino-β-(p-nitrophenyl)-acrylic acid ethyl ester,
β-Methylamino-β-(o-chlorophenyl)-acrylic acid dodecyl amide,
β-Dodecylamino-β-(α-naphthyl)-acrylic acid butyl ester,
β-Dodecylamino-β-(2-furyl)-acrylic acid ethyl ester,
β-Dodecylamino-β-(4-pyridyl)-acrylic acid methyl ester,
β-Dodecylamino-β-(p-nitrophenyl)-propionic acid ethyl ester,
β-Dodecylamino-crotonic acid anilide,
β-Dodecylamino-crotonic acid-(3,4-dichloranilide),
β-Dodecylamino-crotonic acid-(o-anisidide),
N-(β-dodecylamino-crotonyl)-benzenesulfonamide,
β-Dibutylamino-crotonic acid dodecylamide,
β-Dodecylamino-crotonic acid-(N-methylanilide),
β-Morpholino-crotonic acid tetradecylamide,
β-Octadecylamino-crotonic acid anilide,
β-Dibutylamino-crotonic acid anilide,
β-Dibutylamino-butyric acid dodecylamide,
β-Dodecylamino-crotonic acid-(2-chloroethyl ester),
β-Dodecylamino-crotonic acid-(2-phenylhydrazide),
β-Methylamino-crotonohydroxamic acid,
β-Dodecylamino-crotonic acid phenyl ester,
β-(2.4-dichlorophenoxy-acetylhydrazino)-crotonic acid methyl ester,
β-Dodecylamino-β-ethylacrylic acid ethyl ester, and the like.

For the protection of infested plants or plants to be protected against infestation the above compounds may be used as such, but preferably in combination with suitable inert solvents or diluents of solid or liquid nature. Solid extenders are e.g. chalk, talc, bentonite, clay, fuller's earth and the like. Liquid diluents may be of organic solvent nature, but preferably water. In the latter case the use of emulsifiers or surface active agents may be advantageous. Such auxiliary agents are preferably polyglycol ethers of aromatic hydroxy compounds or fatty alcohols.

The following examples are given for the purpose of illustrating the present invention:

Example 1

Fungicidal activity of various $\beta$-amino-$\beta$-aryl-acrylic acid derivatives on Phytophthora infestans on tomatoes:

| Compound | Degree of infestation in percent with preparations at concentrations of | |
|---|---|---|
| | 0.1 | 0.025 |
| $O_2N-C_6H_4-C(NHC_{12}H_{25})=CH-CO_2-C_2H_5$ | 5 | 33 |
| $CH_3O-C_6H_4-C(NHC_{12}H_{25})=CH-CO_2C_2H_5$ | 0.2 | 9 |
| $CH_3O-C_6H_4-C(NHC_{12}H_{25})=CH-CONHNH-C_6H_5$ | 0 | 0.4 |
| $CH_3O-C_6H_4-C(NHC_{12}H_{25})=CHCONHOH$ | 0 | 0.6 |
| pyridyl-$C(NHC_{12}H_{25})=CH-CO_2C_2H_5$ | 8 | 20 |
| furyl-$C(NHC_{12}H_{25})=CH-CO_2C_2H_5$ | 7 | 18 |
| Control agent | 3 | 7 |
| Control test | 100 | |

Example 2

Fungicidal action of various $\beta$-amino-$\beta$-aryl-acrylic acid derivatives on Plasmopara on vine:

| Compound | Degree [1] |
|---|---|
| $C_6H_5-C(NHC_{12}H_{25})=CH-CO_2C_2H_5$ | 10 |
| Control agent (captan) | 9 |
| Control test | 100 |

[1] Of infestation in percent with preparations at concentrations of 0.0125.

Example 3

Acaricidal activity of various $\beta$-aminocrotonic acid amides on the spider mites Tetranychus telarius (green species) at a concentration of 0.2%:

| Compound: | Percent killed after 48 hours |
|---|---|
| $\beta$-Dodecylamino-crotonic-acid anilide | 95 |
| $\beta$-Dodecylamino-crotonic-acid-(o-chloroanilide) | 80 |
| $\beta$-Dibutylamino-crotonic-acid-(N-methyldodecylamide) | 100 |
| $\beta$-Dodecylamino-crotonic-acid-(o-toluidide) | 95 |
| $\beta$-Dipropylamino-crotonic-acid-dodecylamide | 100 |
| N-($\beta$-dodecylamino-crotonyl)-benzene-sulfonamide | 80 |
| $\beta$-Dibutylamino-crotonic-acid-(N-methyl-octadecylamide) | 100 |

Example 4

Ovicidal activity on Tetranychus telarius of $\beta$-dodecylamino-crotonic acid anilide:

| Conc. percent | Percent of hatched insects | | |
|---|---|---|---|
| | Meal moth | Bean bettle | Bee moth |
| 0.1 | 0 | 0 | 0 |
| 0.03 | 0 | 0 | 75 |
| 0.01 | 0 | 35 | 100 |
| 0.003 | 0 | 100 | 100 |

Example 5

Fungicidal activity of various $\beta$-amino-crotonic acid and $\beta$-amino-butyric acid derivatives on Phytophthora infestans on tomatoes:

| Compound | Degree of infestation in percent at concentrations of— | | | |
|---|---|---|---|---|
| | 0.1 | 0.05 | 0.025 | 0.0125 |
| $\beta$-Dodecylamino-crotonic acid anilide | | | 11 | 22 |
| $\beta$-Diisobutylamino-crotonic acid dodecylamide | 2 | 2 | 10 | |
| $\beta$-Tetradecylamino-crotonic acid anilide | 3 | | 19 | 48 |
| $\beta$-Dodecylamino-crotonic acid-(2-chloroanilide) | 1 | | 7 | 31 |
| $\beta$-Dodecylamino-crotonic acid-(2-toluidide) | 0 | | 9 | 17 |
| $\beta$-Dodecylamino-crotonic acid-(2-anisidide) | 1 | | 6 | 12 |
| $\beta$-Dodecylamino-crotonic acid-benzylamide | 0 | | | |
| $\beta$-Dodecylamino-crotonic acid-(N-methylanilide) | 1 | | | |
| $\beta$-Dodecylamino-crotonic acid-(3,4-dichloroanilide) | 0 | | | |
| $\beta$-Diisobutylamino-butyric acid-dodecylamide | 5 | | 13 | 33 |
| N-($\beta$-dodecylamino-crotonyl)-3-nitro-benzene sulfonamide | 0 | | | |
| $\beta$-Dodecylamino-crotonic acid-(2-phenylhydrazide) | 7 | 7 | 16 | |
| $\beta$-Dodecylamino-crotonic acid hydroxane | 3 | 10 | 24 | |
| $\beta$-Dodecylamino-crotonic acid cyclohexylamide | 0 | 8 | 15 | |
| $\beta$-Dodecylamino-crotonic acid dimethyl amide | 11 | | 36 | 38 |
| $\beta$-Dodecylamino-crotonic acid (2-chloroethyl ester) | 21 | | 37 | |
| $\beta$-Dodecylamino-crotonic acid phenyl ester | 16 | 25 | 37 | |
| $\beta$-Dodecylamino-crotonic acid amide | 2 | 14 | 32 | |

Example 5—Continued

| Compound | Degree of infestation in percent at concentrations of— | | | |
|---|---|---|---|---|
| | 0.1 | 0.05 | 0.025 | 0.0125 |
| β-Dodecylamino-crotonic acid-(2-methoxy-ethyl-ester) | 6 | | 17 | 29 |
| β-Dodecylamino-crotonic acid ethanol amide | 1 | | 13 | |
| β-Dodecylamino-crotonic acid (2.6-dimethyl-anilide) | 0 | | 24 | |
| β-Dodecylamino-crotonic acid-diphenyl amide | 4 | | 29 | |
| β-Dodecylamino-crotonic acid-(4-dimethyl-amino-anilide) | 0 | | 30 | |
| β-Dodecylamino-crotonic acid-(2-carboxy-methyl-anilide) | 4 | | 27 | 35 |
| β-Dodecylamino-crotonic acid-(3-cyano-anilide) | 6 | | 27 | 35 |
| β-Dodecylamino-crotonic acid-(4-rhodanic anilide) | 5 | | 41 | 60 |
| β-Dodecylamino-crotonic acid-morpholide | 2 | | 15 | |
| 2-(β-dodecylamino-crotonyl)-aminopyridine | 2 | | 35 | |
| β-Dodecylamino-crotonic acid-(4-hydroxy-anilide) | 3 | | 22 | 41 |
| β-Dodecylamino-crotonic acid-(N-methyl-glucamide) | 13 | | 28 | |
| β-Dodecylamino-crotonic acid-hydroxan (zinc salt) | | | 10 | |
| β-Dodecylamino-crotonic acid hydroxane (manganese salt) | | | 2 | |
| β-Dodecylamino-butyric acid-anilide | | | 14 | |
| β-Dodecylamino-butyric acid-(2-chloroanilide) | 0.5 | | 3 | |
| β-(N-methyl-dodecylamino)-butyric acid anilide | | | 8 | |
| Zineb | 3 | 9 | 17 | 22 |
| Control | | | 100 | |

Example 6

The fungicidal activity of various β-amino-crotonic acid derivatives on Plasmopara on vine is to be seen from the following table:

| Compound | Degree of infestation in percent at concentrations of— | |
|---|---|---|
| | 0.0062 | 0.0031 |
| β-Dodecylamino-crotonic-benzyl-amide | 0 | 1 |
| β-Dodecylamino-crotonic acid-cyclohexyl-amide | 0 | 1 |
| β-Dodecylamino-crotonic acid-dimethylamide | 3 | 5 |
| β-Dodecylamino-crotonic acid hydroxane | 1 | 5 |
| β-Dodecylamino-crotonic acid-(2-phenyl-hydrazide) | 1 | 6 |
| N-(β-dodecylamino-crotonyl)-benzene-sulfon-amide | 0 | 0 |
| Control agent (captan) | 2 | 7 |
| Control test | | 100 |

We claim:

1. A method for combating fungus infestation of a plant which comprises treating the plant with an effective amount of a compound of the formula

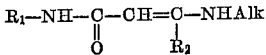

wherein $R_1$ is a member selected from the group consisting of an anilino radical, a phenyl radical and a phenyl-sulfonyl radical; $R_2$ is a member selected from the group consisting of methyl and a phenyl radical; and Alk is an alkyl radical having 10 to 18 carbon atoms.

2. The method of claim 1 wherein the active ingredient is β - (p-methoxy-phenyl) - β - dodecylamino-acrylic acid phenyl-hydrazide.

3. The method of claim 1 wherein the active ingredient is β-dodecylamino-crotonic acid anilide.

4. The method of claim 1 wherein the active ingredient is N-(β-dodecylamino-crotonyl)-3-nitro-benzene sulfonamide.

5. A method for combating mites which comprises contacting the mites with an effective amount of a compound of the formula

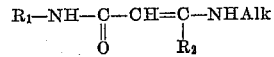

wherein $R_1$ is a member selected from the group consisting of an anilino radical, a phenyl radical and a phenyl-sulfonyl radical; $R_2$ is a member selected from the group consisting of methyl and a phenyl radical; and Alk is an alkyl radical having 10 to 18 carbon atoms.

6. The method of claim 5 wherein the active ingredient is β-(p-methoxy-phenyl - β - dodecylamino-acrylic acid phenyl-hydrazide.

7. The method of claim 5 wherein the active ingredient is β-dodecylamino-crotonic acid anilide.

8. The method of claim 5 wherein the active ingredient is N-(β-dodecylamino-crotonyl)-3-nitro-benzene sulfonamide.

References Cited in the file of this patent

UNITED STATES PATENTS

| | | |
|---|---|---|
| 2,268,206 | Epstein et al. | Dec. 30, 1941 |
| 2,273,849 | Epstein et al. | Feb. 24, 1942 |
| 2,290,174 | Epstein et al. | July 21, 1942 |
| 2,323,391 | Goodman | July 6, 1943 |
| 2,368,195 | Britton et al. | Jan. 30, 1945 |
| 2,505,681 | Martin et al. | Apr. 25, 1950 |
| 2,507,110 | Leekley | May 9, 1950 |
| 2,588,969 | Dickey et al. | Mar. 11, 1952 |
| 2,898,373 | Klaui | Aug. 14, 1959 |
| 2,938,053 | Blake et al. | May 24, 1960 |
| 2,941,002 | Ehrhart et al. | June 14, 1960 |
| 2,945,883 | Alberti et al. | July 19, 1960 |
| 2,959,518 | Uhlenbroek et al. | Nov. 8, 1960 |

FOREIGN PATENTS

| | | |
|---|---|---|
| 809,286 | Great Britain | Feb. 18, 1959 |

OTHER REFERENCES

Knott et al.: "Deutsche Chemische Gesellschaft Berichte," vol. 25, pages 768–778 (1892).